United States Patent [19]

Bednarz

[11] Patent Number: 4,907,450
[45] Date of Patent: Mar. 13, 1990

[54] LOCKABLE WATER METER EXPANSION CONNECTION AND METHOD

[76] Inventor: James W. Bednarz, 1025 W. Crosby, Slaton (Lubbock), Tex. 79364

[21] Appl. No.: 247,955

[22] Filed: Sep. 22, 1988

[51] Int. Cl.[4] ............................................. G01F 15/18
[52] U.S. Cl. ........................................ 73/201; 70/232; 285/32; 285/80
[58] Field of Search ................... 73/201, 273; 285/30, 285/332.2, 338, 355, 80, 31, 32; 70/178, 232

[56] References Cited

U.S. PATENT DOCUMENTS

| | | |
|---|---|---|
| 699,174 | 5/1902 | Hoppes ................................. 73/201 |
| 725,290 | 4/1903 | Speer . |
| 1,473,751 | 11/1923 | Walker . |
| 1,622,216 | 3/1927 | Anlauf et al. . |
| 1,777,811 | 10/1988 | Binkley et al. ...................... 70/178 |
| 1,808,969 | 6/1931 | Porter . |
| 1,911,659 | 5/1933 | Weaver . |
| 1,973,658 | 9/1934 | Redding . |
| 2,449,121 | 9/1948 | Jones . |
| 2,989,323 | 6/1961 | Bass ..................................... 285/32 |
| 3,039,796 | 6/1962 | Lawman . |
| 3,337,181 | 8/1967 | Wennerstrom ..................... 285/30 |
| 3,355,945 | 12/1967 | Perry . |
| 3,583,731 | 6/1971 | Jewell . |
| 4,253,509 | 3/1981 | Collett . |
| 4,335,907 | 6/1982 | Scott . |
| 4,407,146 | 10/1983 | Nielsen, Jr. ......................... 285/80 |
| 4,632,433 | 12/1986 | Kimura . |
| 4,664,426 | 5/1987 | Ueki . |
| 4,803,858 | 2/1989 | Parker ................................. 70/178 |

Primary Examiner—Herbert Goldstein
Attorney, Agent, or Firm—Baker, Mills & Glast

[57] ABSTRACT

A threaded packer (40) is inserted into a first enlarged end (52) of an expansion tube (31). Driver dogs (50) on the threaded packer (40) mesh with dog recesses (54) on the expansion tube (31). The threaded packer (40) and the expansion connection (31) are then threaded onto an outlet pipe (30) on a water meter (10) to interconnect the meter (10) to an inlet (26) and outlet pipe (28). By securely holding the meter (10) the expansion tube (31) may be turned away from the tube (31) with a wrench (70), which forces the packer (40) into the tube (31). By forcing the packer (40) into the tube (31), the tube (31) is pushed into the inlet and outlet butt compression joints creating fluid tight joints. A case (37) is then installed over the expansion connection (32) and is secured in place with a locking pin (68) and a locking bar (67).

42 Claims, 2 Drawing Sheets

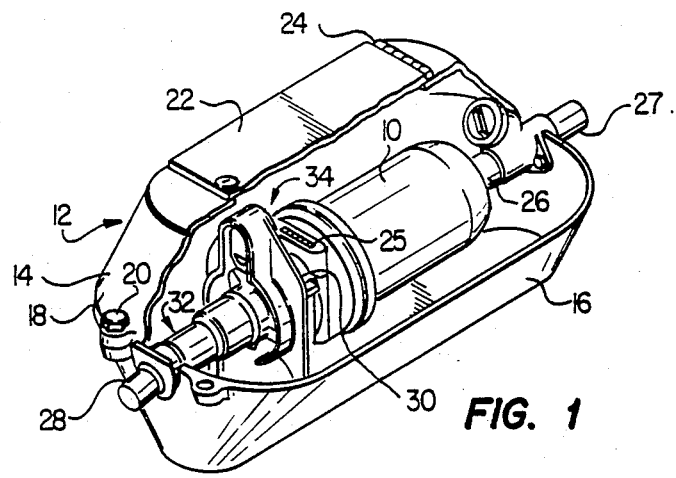
FIG. 1
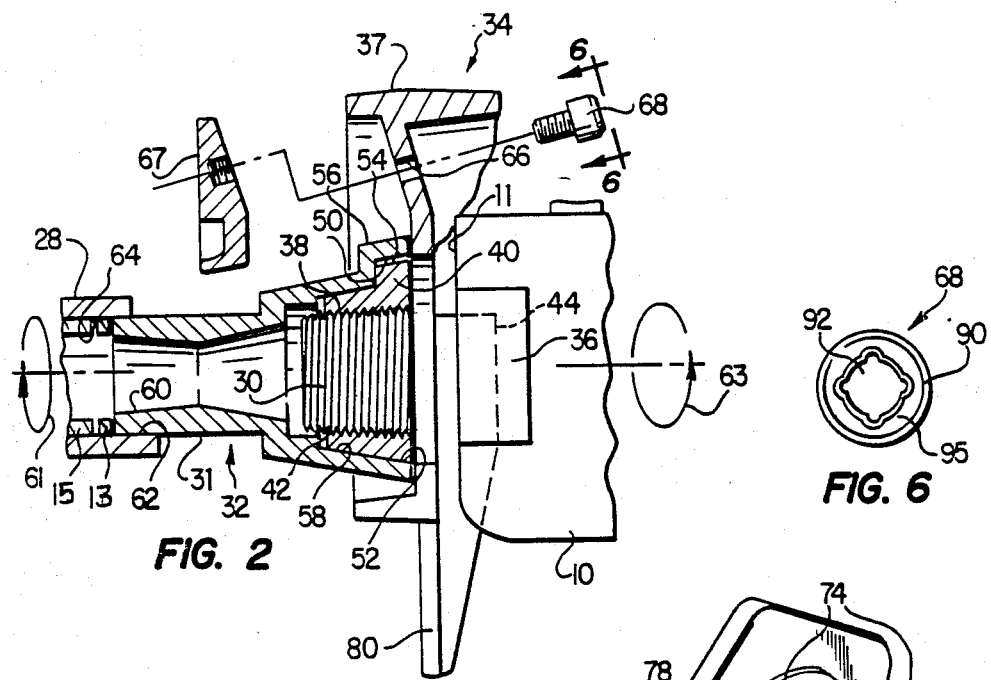
FIG. 2
FIG. 6
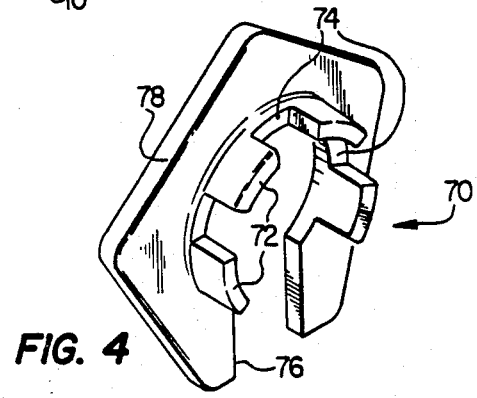
FIG. 4

LOCKABLE WATER METER EXPANSION CONNECTION AND METHOD

TECHNICAL FIELD OF THE INVENTION

This invention relates in general to lockable expansion connections, and in particular to a lockable water meter expansion connection and method.

BACKGROUND OF THE INVENTION

Metering devices, such as gas and water meters, are provided by utility companies to measure usage by individual clients for billing purposes. Such meters are typically housed in a meter box which is recessed in the surrounding surface. There, the meter is "in line" with the inlet and outlet piping and is protected from freezing and incidental as well as willful damage. The meter box typically has a lid thereon to allow the utility company to obtain a reading from the meter and bill the client accordingly.

The meter inlet is connected to a main feed line while the meter outlet, through the use of an expansion connection, is connected to the meter outlet and therethrough to the client's facility. The expansion connection is provided to install, seal and retain the meter in the meter box such that a fluid can be transported, measured, recorded and delivered therethrough to the individual client's facility. Typically, expansion connections are comprised of a plurality of interconnecting pieces including an integral installation and removal hand operable handwheel or wrench.

Unfortunately, many unscrupulous individuals have discovered that it is very easy to loosen the expansion connection by hand and reverse the meter, thereby causing the meter totalizing register to run backwards and register or indicate less than the actual consumption. In some cases, the meters are removed and sold for scrap metal. Additionally, in the case of unscrupulous individuals, when the utility company desires to discontinue service to the customer's facility for nonpayment or other appropriate reasons, neither the current expansion connections nor a valve fixed in the meter box are adequate to positively lock a client off. In these and other situations, the utility company is frequently cheated of their due revenues which is not only illegal, but is also a burden on honest clients who end up bearing the burden for those who cheat. Basically, if the utility company can prevent the meter from being removed from the meter box, it can prevent tampering with the meter.

A device designed to fit over many of the presently made expansion connections to prevent removal thereof is disclosed in pending U.S. patent application Ser. No. 040,922, to Bednarz, filed Apr. 20, 1987 now U.S. Pat. No. 4,852,403. The Bednarz locking device makes the best of poorly designed conventional expansion connections by covering the installation and removal handwheel to prevent loosening of the expansion connection and tampering with the meter. However, typical expansion connections are comprised of an excessive number of intricately machined, close fitting parts and are therefore excessively complex and expensive to manufacture. Moreover, in time, because of the damp and dirty environment, the close fitting parts become corroded and encrusted with mineral deposits, etc., and are difficult if not impossible to operate by hand, as designed. Thus, there is a need for a meter expansion connection that is of simple compact design, comprised of fewer parts which are relatively inexpensive to manufacture, will not be subject to corrosion and the resultant seizing, and designed to be efficiently and surely locked in place with a minimal number of compact, corrosion resistant, tamper proof parts.

SUMMARY OF THE INVENTION

The present invention disclosed herein comprises a method and apparatus for a lockable water meter expansion connection which substantially eliminates or reduces problems associated with prior meter expansion connections. The present invention allows the installation of an improved expansion connection between the outlet of a water meter and the infeed to a customer which may be locked in place.

In accordance with one aspect of the invention, a fluid tight expansion connection connects a first, threaded, fluid carrier to a second fluid carrier. A threaded packer, designed to flow under compression, is threaded onto the first, threaded, fluid carrier. The threaded packer has at least one driver cog on an exterior surface thereof which mates with an expansion tube dimensioned to fit over the threaded packer and between the first, threaded, fluid carrier and the second fluid carrier.

In another aspect of the present invention, a lockable expansion connection for a water meter is provided. A threaded packer is placed inside an expansion tube dimensioned to fit a gap between the water meter and a pipe. The threaded packer, after insertion into the expansion tube, threads onto a water meter outlet. The threaded packer has at least one driver cog on an exterior surface thereof which mates with a cog recess in the expansion tube. A wrench designed to engage driver cogs on the expansion tube is then turned to tighten the water meter and expansion connection into place. A lock case is positioned over and lockably coupled to the expansion connection and water meter to prevent tampering. The lock case is engagably secured in place by using the special wrench to rotate the expansion connection "out of time." Then the entire assembly is locked in place by securing the expansion connection in the "out of time" position through the use of a locking bar and a specially patterned locking pin.

BRIEF DESCRIPTION OF THE DRAWINGS

For a more complete understanding of the present invention and for further advantages thereof, reference is now made to the following Detailed Description taken in conjunction with the accompanying Drawings, in which:

FIG. 1 is a perspective view of a water meter locked in place in accordance with the present invention;

FIG. 2 is a cross-sectional view of the preferred embodiment of the present invention;

FIG. 4 is a perspective view of a wrench used with the present invention;

FIG. 6 is an end elevation view of a threaded locking pin used in conjunction with the present invention.

DETAILED DESCRIPTION OF THE INVENTION

Figure 3:
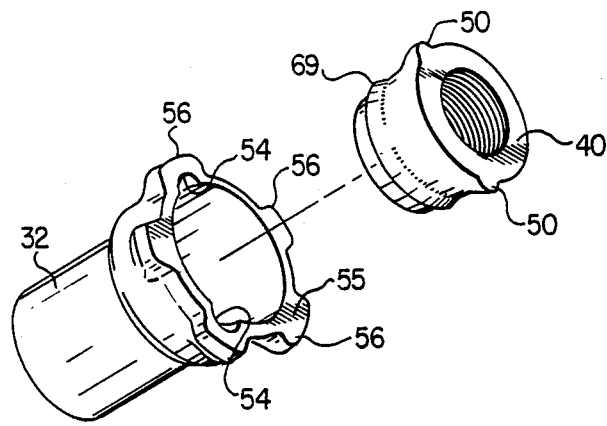
FIG. 3 is an exploded perspective of the threaded packer and the expansion connection.

In FIGS. 1–6, like items are identified by like and corresponding numerals for ease of reference. Referring to FIG. 1, a perspective view of a water meter 10 locked in accordance with the preferred embodiment of the present invention is illustrated. The water meter 10 is installed within a meter box 12 constructed of suitable material for recessing in the ground. The meter box 12 has a top portion 14 and a bottom portion 16 joined together along seams 18 by any appropriate method, such as bolts 20 or welds (not shown). The top portion 14 has a lift off lid 22 which may be opened about hinge 24 (or merely of the pull-off type) to provide access to the internal portions of the meter box 12 and which is typically opened by a meter reader to check the numbers on a recorder 25 on the water meter 10.

The water meter 10 is a device comprised of an individual billing unit fitted with an inlet pipe 26 connected to a water main 27 and an outlet pipe 28 which serves the client. The meter 10 allows the water or gas to pass therethrough and records the volume for future billing purposes. Expansion connection 32 installed between the outlet 30 on the meter 10 and the outlet pipe 28 retains and seals the meter 10 in the meter box 12 and allows water or gas to flow through the individual billing unit and into the customer's facility. Although not shown, it is to be understood that butt joints are used to seal inlet pipe 26 to water main 27 and to seal expansion connection 32 to outlet pipe 28.

In accordance with the preferred embodiment of the present invention, the expansion connection 32 is placed between the meter outlet 30 and the outlet pipe 28. Upon installation, the expansion connection 32 travels away from meter 10, thereby causing the assembly to grow in length, and closes a gap therebetween as will be subsequently described in greater detail. The meter box 12 may then be closed, if there is no desire to provide a tamperproof locking device, and water allowed to flow through the individual billing unit. If it is desired to prevent tampering, a locking device generally identified by the reference numeral 34, is installed as will be subsequently described in greater detail. The locking device 34 is designed to prevent relative rotation between the water meter 10 and the expansion connection 32 thereby preventing unauthorized removal of the meter 10.

Referring to FIG. 2, a cross-sectional view of the expansion connection 32 and locking device 34 constructed in accordance with the preferred embodiment of the present invention is illustrated. The meter 10 has flat exterior sides 36 (only one of which is shown) which a case 37 is designed to engage. The outlet 30 on meter 10 is generally a threaded pipe having standard American Water Works Association (AWWA) threads 38 on an exterior surface thereof.

A threaded packer 40 has internal threads 42 to mate with the external threads 38 on outlet pipe 30 and a tapered outer surface 48 to mate with tapered internal surface 58 of an expansion tube 31. The threaded packer 40 comprises any, compressible, flowable material such as polyurethane or a thermoplastic polyester elastomer which deforms and flows under pressure, such that it conforms to and seals with the adjoining surfaces. The threaded packer 40 should be capable of deforming and flowing sufficiently under pressure or compression such that an approximate 100% engagement is effected between its internal threads 42 and the area of the external threads 38 and between its tapered outer surface 48 and the tapered internal surface 58. Preferably, the threaded packer 40 is constructed of a material that is AWWA and/or Food & Drug Administration approved and has a natural self-lubricity to reduce friction and lower torque, thereby enhancing the installation and sealing process. Threaded packer 40 has at least one external driver cog 50 which will be subsequently described in more detail.

The threaded packer 40 is installed in the internal taper 58 in a first end 52 of the expansion tube 31 The first end 52 of the expansion tube 31 has driver cog recesses 54 to receive the driver cogs 50 on threaded packer 40. Cog recesses 54 are formed in driver cogs 56 (only one of which is shown) to maintain the relative radial position of the expansion tube 31 to the threaded packer 40, as will be subsequently described in greater detail.

The first end 52 of the expansion tube 31 has a tapered internal surface 58 for receiving the tapered outer surface 48 of the threaded packer 40. It has been found that an approximate 10° taper from horizontal provides the threaded packer 40 with a good balance of the compressive and end thrust forces required to properly install and seal meter 10 in the meter box 12. The second end 60 of the expansion tube 31 is held in position by cradle 62 and interfaces with a gasket 13 which is typically installed in open end 64 of outlet pipe 28.

In operation, threaded packer 40 is inserted into the first end 52 of the expansion tube 31 with driver cogs 50 mated to the cog recesses 54. Threaded packer 40 and expansion tube 31 are then threaded clockwise, as indicated by arrow 61, onto outlet 30 of the meter 10 until the first end 52 of expansion connection 32 is approximately flush with face 11 of meter 10. The threaded packer 40 and expansion connection 32 are positioned to allow the second end 60 of the expansion connection 32 to rest within the cradle 62 of outlet pipe 28.

The expansion connection 32 is then turned counterclockwise, as indicated by arrow 63, off of outlet 30 while holding meter 10 in place. Turning the expansion connection 32 off of threads 38 of meter outlet 30 causes the assembly comprised of meter 10 and expansion connection 32 to expand or "grow" in length. The expansion of the assembly causes the inlet end (not shown) of meter 10 and the second end 60 of the expansion connection to jamb into their respective stationary, gasketed seats (for example, second end 60 is jambed into gasket 13 in seat 15), thereby interconnecting meter 10 to inlet pipe 26 and outlet pipe 28 and forming fluid tight joints. This expansion also forces threaded packer 40 deeper into its mating taper 58 thereby causing the flowable packer 40 to deform and decrease in diameter to the extent that the thread engagement between packer threads 42 and meter outlet threads 38 approach 100% thread engagement to form a fluid tight seal.

It can also be seen that as packer 40 is forced into the expansion connection 32, the integral raised ring seal 69 (FIG. 3) on packer 40 outer surface 48 will be the first packer surface to contact and seal against tapered internal surface 58. As the packer 40 is forced deeper into the expansion connection 32, the mating tapers 48 and 58 interact and approximate a 100% engagement, thereby forming a fluid tight seal. If there is no need to lock the expansion connection 32, no further action is required.

An unauthorized person could loosen the expansion connection 32 and remove the meter by simply reversing the process as described above. To preclude such an event, a locking device 34 must be installed over expansion connection 32. The installation and tightening action of turning the expansion connection 32 counterclockwise 63, off outlet end 30, forms a small gap between face 11 of meter 10 and cog face 55 (FIG. 3) on the first end 52 of expansion tube 31. Partial flanges 88 (FIG. 5) on case 37 are slidably transported to lie within this gap to help prevent tampering with meter 10.

Figure 5:
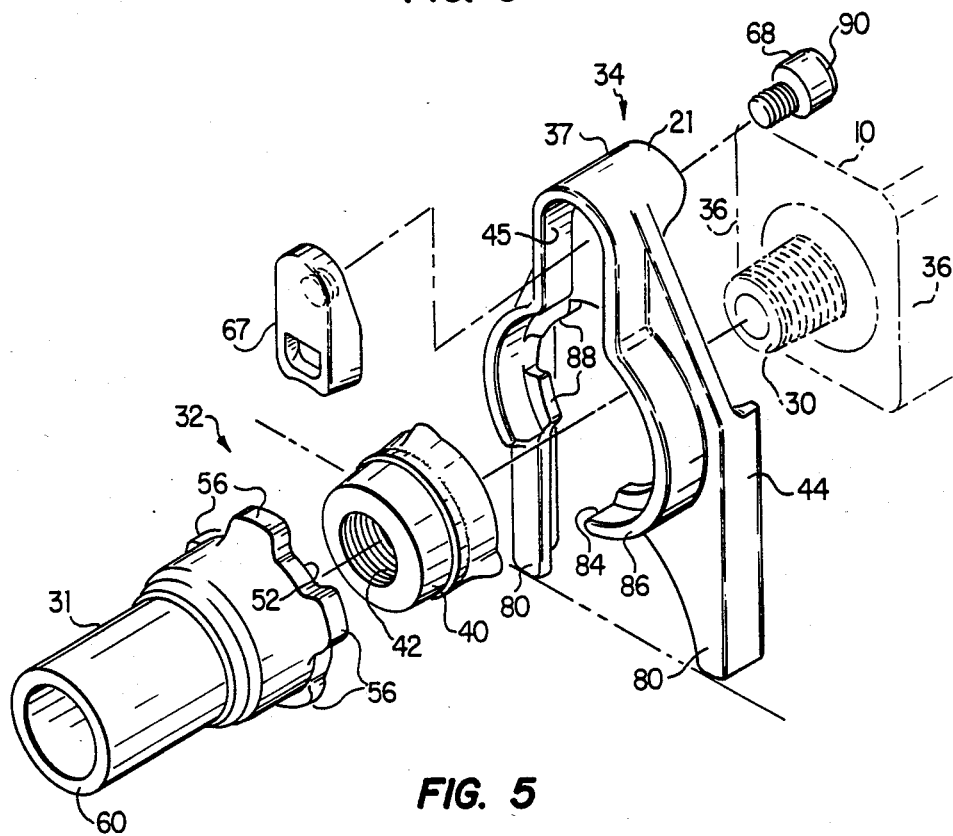
FIG. 5 is an exploded perspective view of the lock and expansion connection.

Bar 44 engages the flat exterior sides 36 of meter 10 and legs 80 engage the bottom surface of bottom portion 16 of the meter box 12 (FIG. 1) to prevent the rotation of meter 10 and the locking device 34 thereby precluding the exposure of void 84 (FIG. 5). After case 37 is installed over expansion connection 32 and interlocked in the gap, it is secured in place with locking bar 67 and threaded locking pin 68 through hole 66 as will be subsequently described in greater detail.

Referring to FIG. 3, the expansion tube 31 is illustrated with five evenly spaced driver cogs 56 having cog faces 55. The cog recesses 54 of the driver cogs 56 receive the driver cogs 50 when the threaded packer 40 is inserted into first enlarged end 52. Threaded packer 40 may have an integral raised ring seal 69 formed around its external circumference to assist with the sealing process.

Testing has shown that it is preferable to provide at least two driver cogs 50 on the threaded packer 40. The two driver cogs 50 distribute the torsional load and provide sufficient interface with the cog recesses 54 such that the torque applied to expansion connection 32 during installation and tightening steps will be relayed to threads 42 of threaded packer 40. It is to be understood that threaded packer 40 may be supplied with more or less than two driver cogs. It is also to be understood that tube 31 may be provided with more or less than five driver cogs 56 and more or less than two cog recesses 54.

In FIG. 4, a specially designed hand operated wrench 70 is illustrated in perspective view. The wrench 70 will be provided only to authorized personnel and is designed to fit and extend within cog shroud 86 (FIG. 5) and engage the driver cogs 56 on the expansion tube 32. Void 76 allows for easy installation and removal of wrench 70. The wrench 70 may be used to simply tighten or loosen the expansion connection 32, or in the event that locking device 34 is to be installed or removed, to properly time the driver cogs 56 to clear or engage, as the case may be, with partial flange 88 as will be subsequently described in more detail. Protrusions 72 extend axially from wrench 70 and are separated by spaces 74 which receive the driver cogs 56 while the protrusions 72 fit therebetween. As illustrated, the exterior perimeter 78 of wrench 70 forms a general pentagon shape, but it is to be understood that the exterior perimeter 78 may be any other appropriate shape.

Referring to FIG. 5, an exploded perspective view of the expansion connection 32 and locking device 34 is illustrated. Locking device 34 comprises a material sufficiently durable such as bronze or steel to prevent unauthorized personnel from easily destroying and removing locking device 34 from the expansion connection 32. Case 37 is fitted with eyebrow 21, cog shroud 86 and locking bar recess 45 to enhance tamper resistance. Eyebrow 21 is constructed and positioned in such a way that access to the head 90 of locking pin 68 with common wrenches, prybars, chisels, hacksaws, etc., is almost impossible. The locking pin 68 is comprised of hardened steels which preclude drilling, hacksawing, filing or denting with a chisel. Locking pin 68 is removable only through the use of a specially designed, supertough, key-wrench as will be subsequently described in greater detail.

Cog shroud 86 is a ring formed to closely receive driver cogs 56 of expansion tube 31. Cog shroud 86 effectively shields and protects the driver cogs 56 positioned there within from tampering such that radial removal of case 37 is obstructed.

Locking bar recess 45 is designed so that locking bar 67 is recessed below the face thereof to prevent tampering. The sides of locking bar recess 45 align and maintain the position of locking bar 67 such that locking bar 67 will couple with driver cogs 56 and restrict the subsequent retiming of expansion connection 32. Case 37 has cog shroud 86 with partial flange 88 extending radially inward therefrom. Void 84 in cog shroud 86 allows case 37 to be placed over a previously installed expansion connection 32. The void 84 is dimensioned to fit over outlet end 60 of expansion connection 32 while cog shroud 86 prevents radial removal once case 37 is transferred into position over first enlarged end 52. Partial flange 88 is a plurality of radially extending tabs dimensioned to pass over and behind driver cogs 56. The expansion connection 32 is then turned "out of time" thereby aligning cogs 56 and partial flange 88 in such a way that case 37 is axially restrained in the gap between cog face 55 (FIG. 3) and face 11 of meter 10. Locking bar 67 is then inserted in locking bar recess 45, so as to fit between two consecutive driver cogs 56 to prevent both the retiming of the expansion connection 32 and the rotation of expansion connection 32 relative to meter 10.

In operation, wrench 70 is used to properly install, tighten and position expansion connection 32 into place. The wrench 70 engages the driver cogs 56 and turns expansion connection 32 placing a driver cog 56 in the vertical position. The case 37 is then placed over expansion connection 32 and is transferred into position by first engaging and then passing the partial flange 88 over and behind driver cogs 56. The partial flange 88 is now positioned in the gap formed between cog face 55 and face 11 of meter 10. In this final position bars 44 engage the flat exterior sides 36 on water meter 10 to prevent rotation of the case 37 relative to meter 10. With the aid of wrench 70 the driver cogs 56 (shielded within cog shroud 86) are engaged and rotated "out of time" such that cogs 56 are aligned with partial flange 88. This rotating "out of time", traps the partial flange 88 between face 11 and cog face 55, thereby restricting axial movement of case 37. The locking bar 67 is then placed in the locking bar recess 45 and between two adjacent off-vertical cogs 56. The threaded locking pin 68 is then inserted through case 37 and is threadably engaged with locking bar 67. Locking bar 67 obstructs cogs 56 in such a way that cogs 56 are locked in the "out of time" position.

Locking device 34 is a lockable coupling designed to prevent relative rotation between the expansion connection 32 and meter 10, thereby preventing removal or tampering thereof. The bars 44 on case 37 engage the flat exterior sides 36 of meter 10, while the installation of locking bar 67 and pin 68 completes the coupling and locks the expansion connection 32 in place in such a way that the rotating and re-timing thereof is precluded. Case 37 is retained in axial position by partial flange 88 being held captive between face 11 and cog face 55 and in radial position by cogs 56 being held captive by cog shroud 86.

The legs 80 are of sufficient length to approximately touch the bottom portion 16 of the meter box 12 to prevent rotation of case 37 and the subsequent exposure of gap 84 to tampering.

Case 37 having legs 80 and void 84 is the preferred embodiment which allows an expansion connection 32 to be locked at a later date without removing the water meter 10. It is to be understood that void 84 and legs 80 could be deleted from case 37. In this form, the case 37 would be placed over the expansion connection 32 before installing the meter 10. Without the legs 80, the entire assembly could rotate in unison, there would be not void 84 to tamper with and the water meter 10 would remain locked to the expansion connection 32 because relative rotation between the two is still restricted. After the installation and locking sequence is completed, the wrench 70 may be removed and lid 22 closed until a meter reading must be taken.

The meter expansion connection thus formed is superior to previously developed expansion connections in that it consists of one compact, simple metal tube and a single, threaded, sealing component. The prior art consists of three extensively machined, close fitting, metal components and two sealing components. The prior art is overly complex in design and suffers from corrosion and seizing. Moreover, because of the integral handwheel, it is relatively easy to tamper with and somewhat cumbersome to lock. Conversely, the expansion connection described herein is of very simple design, is of reduced size, and more importantly, will not corrode or seize and is designed to be tamper resistant if used along or as an integral part of a locking device, if so required.

The introduction of driver cogs and the use of a detachable installation wrench, in lieu of an integrally attached handwheel, not only reduces the size of the expansion connection and enhances its tamper resistance, but also provides the engaging mechanism which couples the expansion connection to the meter and retains the locking device in position.

Referring to FIG. 6, an end elevation view of a threaded locking pin 68 is illustrated. The pin 68 is constructed with a generally cylindrical head portion 90. The radial face 92 of head portion 90 is fitted with a particular, nonsymetrical, shallow, annular recessed groove 95 which acts as a lock. The annular recessed groove 95 is purposefully narrow, shallow and nonsymetrical, thereby increasing the complexity of making a bogus key-wrench. The locking pin 68 can only be installed and removed by using a special key-wrench (not shown) which fits the particular recessed annular groove 95 of head 90 and is forged from a very tough material which is not readily available to the general public.

The locking pin 68 will be installed at a specific torque and will also be sealed and additionally secured in place by the use of an anerobic compound. This anerobic compound will seal the threaded shank 94 from contaminants and will also increase the removal torque by a predetermined amount. Because of the inherent design, a bogus key made from normally available materials will fail because of the high torque required to remove the locking pins 68.

Although not shown, it is to be understood that the present invention can be effectively used with other types of fluid meters such a gas meter. Additionally, since the locking device 34 and expansion connection 32 may be removed only by authorized personnel, it is possible to lock off the fluid flow to the client by installing a blindwasher (not shown) in connections to the meter 10.

Although the present invention has been described with respect to a specific preferred embodiment thereof, various changes and modifications may be suggested to one skilled in the art, and it is intended that the present invention encompass such changes and modifications as fall within the scope of the appended claims.

What is claimed is:

1. A fluid tight expansion connection for connecting a first threaded fluid carrier to a second fluid carrier, comprising:
   a threaded packer threadable onto the first fluid carrier; and
   a hollow expansion tube dimensioned to slidably receive said packer and to connect the first threaded fluid carrier to the second fluid carrier when said expansion tube and said threaded packer are turned in a direction opposite said threading while the first threaded fluid carrier is held in place.

2. The apparatus of claim 1, wherein said packer comprises a compressible flowable material.

3. The apparatus of claim 2, wherein said compressible flowable material comprises polyurethane.

4. The apparatus of claim 3, wherein said threaded packer is self-lubricating.

5. The apparatus of claim 2, wherein said compressible flowable material comprises a thermoplastic polyester elastomer.

6. The apparatus of claim 1, wherein said packer further comprises a tapered outer surface.

7. The apparatus of claim 6, wherein said tube further comprises a tapered internal surface to match said tapered outer surface of said packer.

8. The apparatus of claim 1, wherein said expansion tube further comprises a plurality of driver cogs.

9. The apparatus of claim 8, wherein at least one of said driver cogs further includes an internal cog recess.

10. The apparatus of claim 9, wherein said packer further includes at least one driver cog dimensioned to fit into said internal cog recess.

11. The apparatus of claim 1, wherein said packer further comprises an external raised ring seal.

12. The apparatus of claim 1, further comprising a lock to secure said expansion connection against unauthorized removal.

13. Apparatus for locking a fluid meter to a continuation pipe, comprising:
   a threaded packer dimensioned to thread onto an outlet pipe on the meter;
   an expansion tube dimensioned to slidably receive said threaded packer and interconnect said outlet pipe to the continuation pipe;
   a case dimensioned to fit over said expansion tube proximate the meter;
   a locking bar meshing with said case and said expansion tube to prevent turning thereof relative to the meter; and
   a threaded locking pin to secure said locking bar to said case, such that when the case is secured in place, said expansion tube is prevented from unauthorized removal.

14. The apparatus of claim 13, wherein said threaded packer comprises a compressible material capable of flowing under pressure.

15. The apparatus of claim 14, wherein said compressible material comprises polyurethane.

16. The apparatus of claim 15, wherein said threaded packer is self-lubricating.

17. The apparatus of claim 14, wherein said compressible material comprises a thermoplastic polyester elastomer.

18. The apparatus of claim 13, wherein said packer further comprises a tapered outer surface.

19. The apparatus of claim 18, wherein said tube further comprises a tapered internal surface generally matching said tapered outer surface of said packer.

20. The apparatus of claim 13, wherein said threaded packer further comprises an external raised ring seal.

21. The apparatus of claim 13, wherein said expansion tube further comprises a plurality of driver cogs on an external surface thereof.

22. The apparatus of claim 21, wherein at least one of said driver cogs further includes an internal cog recess.

23. The apparatus of claim 22, wherein said packer further- includes a driver cog dimensioned to fit into said cog recess such that rotation of said expansion tube causes rotation of said packer.

24. The apparatus of claim 21, further including a wrench comprising a plurality of protrusions to fit between said driver cogs to securely engage and drive said expansion tube.

25. The apparatus of claim 13, wherein said case includes bars which engage the meter to prevent relative rotation between the meter and the expansion tube.

26. The apparatus of claim 13, wherein said case further includes a partial flange for engaging said expansion tube to prevent removal of said case axially.

27. The apparatus of claim 13, wherein said threaded locking pin further comprises a specially patterned protrusion recessed into a generally cylindrical head.

28. The apparatus of claim 13, wherein said case further comprises a cog shroud for engaging said expansion tube to prevent removal of said case radially.

29. Apparatus for locking an expansion connection to a fluid meter, comprising:
   a case dimensioned to fit over the expansion connection, a portion of said case engaging the fluid meter, said portion that engages the fluid meter having bars;
   a locking bar simultaneously engaging said case and the expansion connection to prevent turning of the expansion connection relative to the meter; and
   a threaded locking pin passing through said case into said locking bar, such that the expansion connection is locked in place.

30. The apparatus of claim 29, wherein said case further comprises a partial flange for engaging the expansion connection.

31. The apparatus of claim 29, wherein said locking pin comprises a specially patterned face recessed within a generally cylindrical head.

32. A method for installing a fluid tight expansion connection between a first threaded pipe and a second pipe, comprising the steps of:
   inserting a compressible threaded packer into an expansion tube dimensioned to interconnect the first and the second pipes;
   threading said threaded packer and said expansion tube onto the first threaded pipe to interconnect the first pipe to the second pipe; and
   forcing said packer into said expansion tube by turning said packer and said tube in a direction opposite said threading, while preventing the first pipe from turning, such that the fluid tight expansion connection is installed.

33. The method of claim 32, wherein the step of inserting further comprises matching at least one driver cog on said packer with a cog recess in said expansion tube.

34. The method of claim 32, wherein the step of forcing further comprises holding driver cogs on an external surface of said expansion tube with protrusions on a wrench to turn said tube.

35. The method of claim 32, wherein the step of forcing further comprises applying pressure to said packer such that said packer flows into threads on the first threaded pipe.

36. The method of claim 32, further comprising the step of locking the expansion connection to prevent removal thereof.

37. The method of claim 32, further comprising the steps of tapering an outer surface of said packer and an internal surface of said tube to approximately match.

38. A method for locking a fluid meter comprising the steps of:
   inserting an internally threaded packer into a first enlarged end of an expansion tube;
   threading said threaded packer and said expansion tube onto a threaded outlet pipe on the meter;
   inserting a second end of said expansion tube into a receptacle on a fluid continuation pipe such that said expansion tube connects and seals said outlet pipe to said fluid continuation pipe;
   turning said threaded packer and said expansion tube in a direction opposite to said threading while holding said threaded outlet pipe in place to force said expansion tube into said receptacle and force, said threaded packer to flow into and seal threads on said threaded outlet pipe and to seal an inside surface of said tube;
   installing a case over said expansion tube; and
   securing said case in place with a locking pin and locking bar such that the meter cannot be turned relative to said expansion tube and said expansion tube is prevented from unauthorized removal.

39. The method of claim 38 wherein the step of inserting said packer into said tube comprises sliding said packer into said expansion tube to match at least one driver cog on said packer with a cog recess on said tube.

40. The method of claim 38, wherein the step of turning further comprises meshing driver cogs on said expansion tube with protrusions on a wrench to turn said tube.

41. The method of claim 38, wherein the step of installing a case further comprises engaging bars on said case with the meter.

42. The method of claim 38, wherein the step of securing comprises:
   inserting said locking pin through said case;
   threading said locking pin into said locking bar; and
   meshing said locking bar with said expansion tube.

* * * * *